United States Patent [19]

Frenette

[11] 4,034,880
[45] July 12, 1977

[54] INSTANT LOAD RELEASE SYSTEM
[75] Inventor: Lionel G. Frenette, Hudson, N.H.
[73] Assignee: Victor T. Guertin, Trustee, Nashua, N.H.
[21] Appl. No.: 650,256
[22] Filed: Jan. 19, 1976
[51] Int. Cl.² .......................................... B60P 1/04
[52] U.S. Cl. ............................... 214/510; 298/1 B
[58] Field of Search ........... 214/82, 510, 44 B, 310; 298/1 B

[56] References Cited
U.S. PATENT DOCUMENTS

| | | | |
|---|---|---|---|
| 3,626,489 | 12/1971 | Pioch | 214/510 |
| 3,975,052 | 8/1976 | Pitts | 214/82 X |

Primary Examiner—Robert G. Sheridan
Attorney, Agent, or Firm—Pearson & Pearson

[57] ABSTRACT

A large, sealed, roll-off container of compacted waste is provided with a transversely extending, angle iron, ejection bar which is instantly, progressively pulled rearwardly along the floor of the container by a cable attached to the frame of a tilt bed vehicle, as the tilt bed is lifted to discharge the compacted load through a rear opening. A pair of extension cables are normally looped around the front end of the load and pressed against the inside wall surfaces of the container by the force of compaction. These cables compress the front of the load to free it from adherence to the walls immediately upon tilt.

8 Claims, 7 Drawing Figures

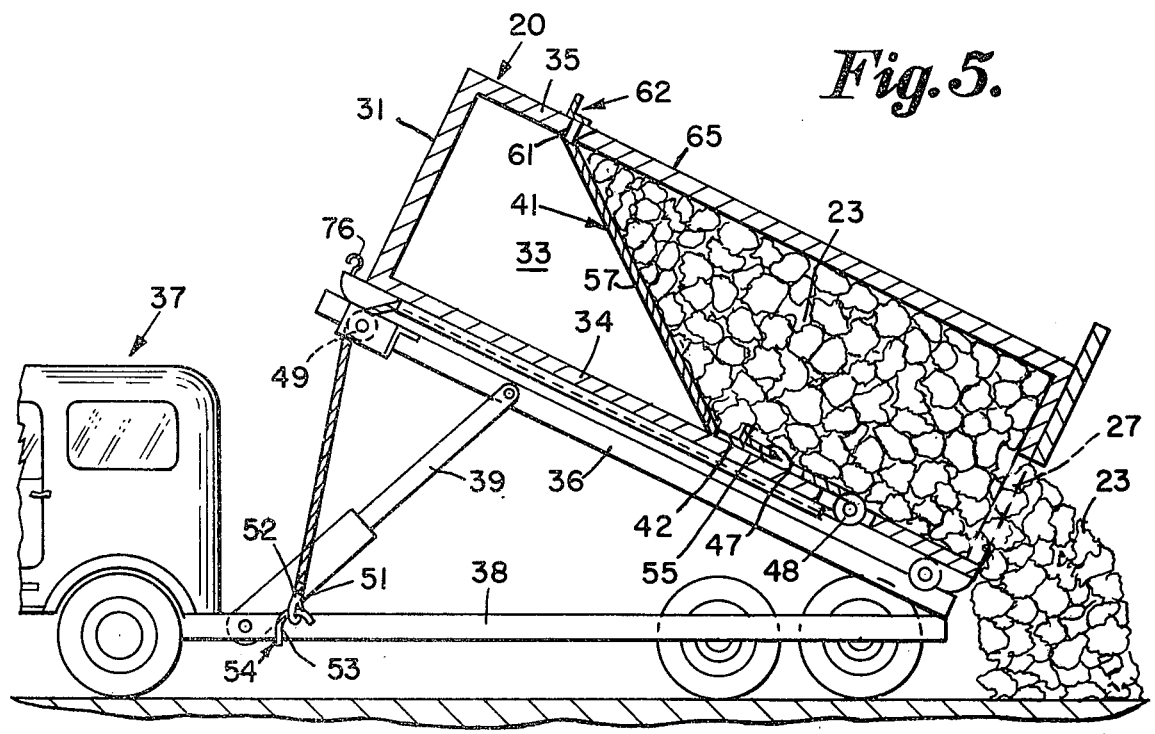
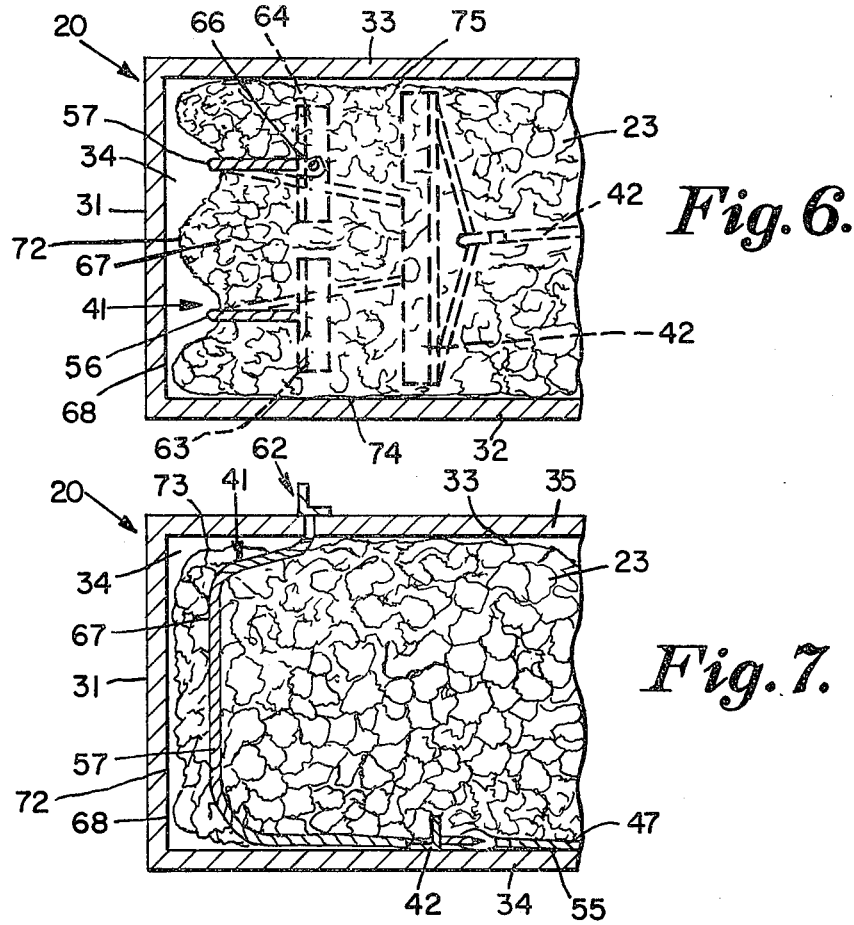

INSTANT LOAD RELEASE SYSTEM

BACKGROUND OF THE INVENTION

Elongated, sealed, roll-off containers, stationed with powerful piston type compacters at business establishments for collecting and compacting waste are emptied by being transported to a suitable dump on a tilt bed vehicle. Such containers have an openable rear closure and are tilted upwardly by the tilt bed and hydraulic mechanism on the vehicle to discharge the compacted waste load by gravity through the rear opening.

The waste is compacted at a pressure of twenty tons per square inch, and when it includes garbage, or other sticky material, or when it includes liquids capable of freezing in northern climates, the compacted waste tends to stick to the inside faces of the front of the container and fail to discharge by gravity.

PRIOR ART

It has heretofore been proposed to mount a horizontal cleaning plate transversely of the bed of a dump box of a dump truck by pull cable connection to the frame so that the plate will move rearwardly as the dump box is lifted in U.S. Pat. No. 3,164,410 to Robinson of Jan. 5, 1965.

A similar mechanism is disclosed in U.S. Pat. No. 3,626,489 to Pioch of Dec. 1971 wherein the cleaning member is a tube of relatively large diameter and a lost motion mechanism is provided to delay the movement of the ejection bar until the tilt bed is midway of its tilt.

SUMMARY OF THE INVENTION

In this invention, the ejection bar, or cleaner plate, is a transversely extending angle iron with the vertical web facing rearwardly so that its upstanding web will serve as a scraper blade. At least one pull cable extends rearwardly from the cargo ejecting angle iron along the floor of the container, thence forwardly under the floor and thence downwardly to an anchor on the frame so that the angle iron moves instantly and continuously as the compacted container is lifted by the tilt bed.

Unlike the above devices of the prior art however, the system of this invention includes a pair of extension cables, each looping forwardly from one of the opposite sides of the ejection bar, thence upwardly along the front inside of the container and thence rearwardly under the roof to anchoring means. Also, unlike such devices, there is no costly and complicated return mechanism for the ejection bar, or for the cables, because the cables are intended to initially be loose and to be moved rearwardly with the bar by the tremendous pressure of the waste being compacted from rear to front of the container.

Thus, as the waste is compacted the extension cables are pressed forwardly of the container until they are each looped against the wall surfaces and are encompassing the forward end of the compacted load at one or more feet inwardly from the side walls of the container.

It will be seen that the instant pull on the ejection bar not only scrapes the floor of the container from front to rear but also exerts an instant pull on the side by side extension cables which tends to compress and squeeze the front end of the compacted load, thereby distorting the exterior surfaces of the load away from the adjacent inside surfaces of the container to which they may have been adhered. This distortion and compression of the front end of the load, together with the separation of the bottom of the load from the floor by the angle iron ejection bar, gives the necessary instant load release to enable the force of gravity to discharge the compacted waste from the container.

BRIEF DESCRIPTION OF THE DRAWING

FIG. 5 is a view similar to FIG. 4 showing the roll-off container lifted to a greater angle and the load discharging;

FIG. 6 is a diagrammatic plan view and

FIG. 7 is a diagrammatic side view in section showing the action of the extension cables in compressing the front end of the compacted load to pull the trash away from the walls.

DESCRIPTION OF THE PREFERRED EMBODIMENT

Figure 1:
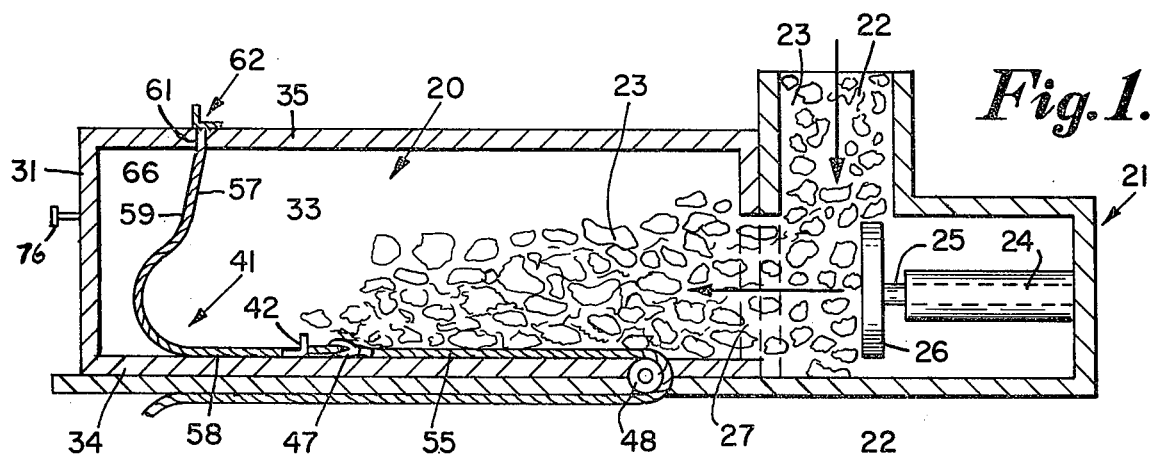
FIG. 1 is a side elevational view, in half section of a typical rubbish compactor system with the instant load release of the invention installed in the compacted waste, roll-off container.

A typical sealed, elongated, roll-off container 20 is shown in the drawings, as used with a compactor 21 at a commercial establishment such as a supermarket.

The compactor 21 is of a well known type such as a BFI compactor system made by Browning-Ferris Industries, Inc., of Houston, Tex., and includes a hopper 22 for receiving trash, waste 23, etc., an hydraulic cylinder 24, piston 25 and compactor piston head 26, powered by a source not shown and arranged to compact the waste 23 into the container 20, through the rear opening 27. The roll-off container 20 is sealed for transport by the openable rear door 28 and includes the front wall 31, side walls 32 and 33, floor 34 and top wall, or roof, 35.

Figure 3:
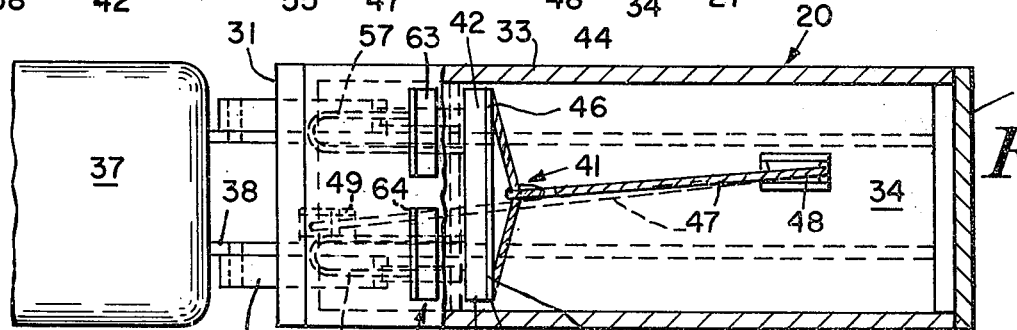
FIG. 3 is a plan view, with parts broken away, of the loar release mechanism of the invention with the trash container mounted on a truck for delivery to a dumping area.
Figure 4:
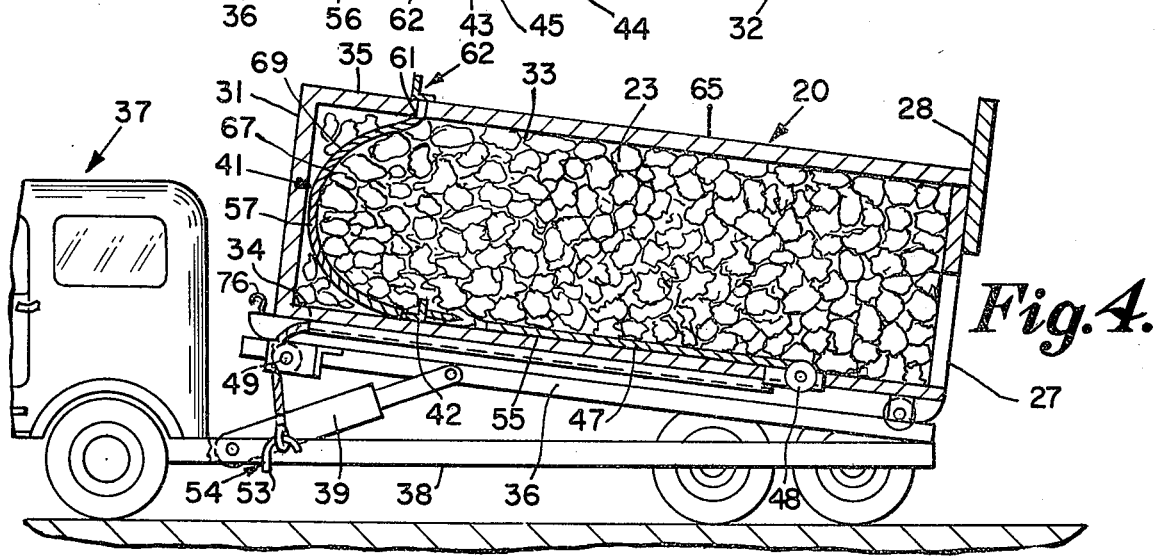
FIG. 4 is a side elevational view, similar to FIG. 2, showing the roll-off container on the truck and being lifted for discharge with the load release cables and bar instantly and progressively loosening the load from the walls of the container.

As shown in FIGS. 3-5 the large roll-off container 20, when full of the tightly compacted waste 23, is closed, sealed and rolled onto the tilt bed 36 of a tilt bed motor vehicle 37 having a frame 38 and hydraulic lift mechanism 39.

The instant load release system 41 of the invention, includes the cargo ejecting bar 42 which extends transversely of the floor 34 for substantially the full width of the inside of the container 20 and which is normally proximate the front of the container 20 as shown in FIG. 1. Ejection bar 42 is preferably an angle iron having a horizontal web 43 for riding along floor 34 and an upstanding, vertical, web 44 for serving as a scraper, or push, blade in separating the bottom 55 of the compacted load 23 from the floor 34. The bar 42 is about six feet in length from one side 45 to the other side 46 and the webs 44 and 45 are about 4 or 5 inches in width or height.

A flexible pull cable 47 extends rearwardly along floor 34 to a first pulley 48 and thence forwardly under floor 34 to a second pulley 49 and thence downwardly with an eye 51 at the terminal end 52 removably attached to the hook 53 on the frame 38 of vehicle 37. The hook 53 and the eye 51 constitute second anchoring means 54 and it will be apparent that, since there is no lost motion, the bar 42 will commence to move and separate the bottom 55 of load 23 from floor 34 immediately upon the commencement of lift of the tilt bed 36, the pull being continuous as shown in FIGS. 4 and 5.

The instant load release system 41 does not include any spring actuated, or cable actuated, return mechanism for bar 42. As shown in FIG. 1 the bar 42 is however connected at each opposite side 45 or 46 to one of at least two flexible, extension, cables 56 or 57. Each extension cable such as 56 normally extends in a loop forwardly as at 58, and upwardly as at 59 to a terminal end 61 affixed to first anchoring means 62 in the roof 35 of the container.

First anchoring means 62 is preferably a pair of angle irons 63 and 64 welded, or otherwise secured to the exterior 65 of roof 35 and each having a suitable integral element 66 extending through the roof and permanently affixed to one of the ends 61 of the extension cables 56 or 57. It will be understood that the forces exerted on the extension cables for loosening the front end 67 of the compacted, and often frozen, load 23 are tremendous and might tend to damage roof 35 if the force was not distributed by means 62. Element 66 is preferably a strong U-shaped bolt.

Figure 2:
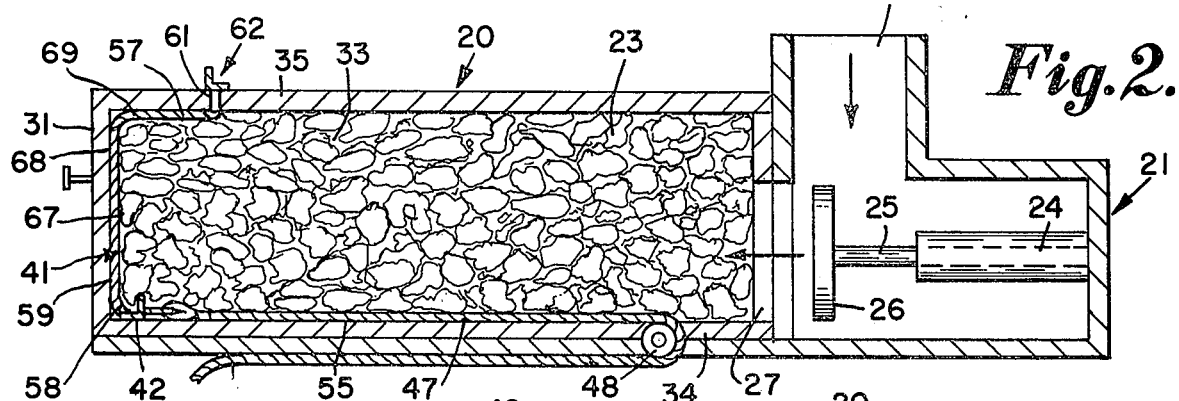
FIG. 2 is a view, similar to FIG. 1, showing the roll-off container filled compactly with trash, which may be frozen, or adhered to the walls and showing the load release cables fully extended.

As shown in FIG. 2, the bar 42 and the extension cables 56 and 57 are pushed forwardly to encompass the front end 67 of the load 23, by the pressure exerted in compacting the load and looped forwardly at 58 along floor 34, thence upwardly at 59 along the inside face 68 of front wall 31 and thence rearwardly at 69 along roof 35 to first anchoring means 62.

As best shown in FIGS. 4, 6 and 7 the instant movement of bar 42 in a rearward direction simultaneously causes instant tension on the extension cables 56 and 57, thereby exerting compression and squeezing on the front end 67 of compacted load 23 resulting in distortion of the front end which tends to pull the bottom face 55, front face 72, top face 73 and side faces 74 and 75 of the front end 67 away from any adherence to the corresponding inside faces of the container 20. This release effect, coupled with the release effect of the bar 42 along the bottom of the load enables gravity to discharge the load without requiring lifting to the full extent of hydraulic lift mechanism 39.

During transit the cable eye 51 may be attached to a suitable pin or hook 76 on container 20.

I claim:

1. In a solid waste disposal system of the type having a large, sealed roll-off container of compacted waste mounted on a tilt bed vehicle for discharge of the contents through an openable rear end and having a cargo ejecting bar adapted to be pulled rearwardly inside the container to assist the discharge as the container is tilted the combination of instant load release means comprising:

at least two flexible, extension, cables each affixed to one of the opposite sides of said bar at one end and extending in a loop forwardly upwardly and rearwardly therefrom to an opposite end permanently affixed to first anchoring means at one of the opposite sides of the roof of said container, at a spaced distance in rear of the front wall thereof;

and at least one flexible pull cable extending rearwardly from said bar to proximate the rear of the floor of said container, around a first pulley, thence forwardly under said floor to proximate the front of said container, around a second pulley and down to a second anchoring means on the frame of said vehicle;

said extension cables normally contacting the floor, front wall and roof inside said container under the pressure of the compacted waste therein but instantly and progressively compressing the opposite sides of the front of said load of compacted waste to free it from adhesion to the inside surfaces of said container under the pull of said bar and pull cable immediately upon commencment of tilt discharge of said container.

2. A solid waste disposal system as specified in claim 1 wherein:

said first anchoring means comprises a pair of angle irons each affixed transversely of the exterior of the roof of said container and having an element extending through said roof for affixation to one of the ends of said extension cables for distributing the forces exerted thereon during instant load release.

3. A solid waste disposal system as specified in claim 1 wherein:

said second anchoring means includes an eye affixed to the free terminal end of said pull cable and a hook affixed to said vehicle frame, said eye being removable from said hook to permit said container to be free to be rolled off said vehicle for collection of waste and compaction thereof.

4. A solid waste disposal system as specified in claim 1 wherein:

said cargo ejecting bar is an angle iron extending transversely of the floor of said container for substantially the full width thereof, said angle iron having its horizontal web riding on the floor of the container and having its vertical web at the rear thereof to present an upstanding scraper blade wall to said compacted waste for scraping, and freeing, the same from adhesion to said floor.

5. Apparatus for ejecting a load of compacted waste from the rear end opening of a roll-off container when said container is tilted for rear end discharge on a tilt bed vehicle, said apparatus comprising:

an ejection bar extension transversely of, and movable longitudinally along, the floor of said container from proximate the front to proximate the rear thereof;

at least one flexible pull cable connected to said ejection bar and extending rearwardly along said floor and thence forwardly under said floor to a terminal and attached directly, independent of lost motion, to a part of said vehicle;

and at least two flexible extension cables each affixed at one end to one of the opposite sides of said bar and extending forwardly from said ejection bar along said floor, thence up the inside of the front wall of said container and thence rearwardly along the inside of the roof of said container to an opposite end affixed at one of the opposite sides of said roof at a spaced distance in rear of said front wall, said extension cables encompassing the compacted front end of said load on each opposite side of the front end thereof and being adapted to loosen said front end from the inside wall surfaces of said container as said pull cable exerts an immediate and continuous tension thereon during lifting.

6. Apparatus for ejecting a frozen load of compacted waste from the rearward end of a roll-off box when said box is tilted on a tilt bed vehicle said apparatus comprising:

an ejection bar extending transversely on the floor of said box under the forward part of said load, cable means connecting said bar to said vehicle for exerting a rearward pull on said bar during tilting of said box to free the bottom of said load from said floor;

extension cable means having one end anchored to the roof of said box, at a spaced distance from the front wall thereof, thence extending forwardly to said front wall, thence downwardly between said front wall and the front of said load and thence rearwardly along the floor of said box to the other end of said cable means, said cable means thereby encompassing each opposite side of the front of said load, and power means exerting a rearward pull on said other end of said cable means for exerting compressive squeezing forces on the front of said load to free the same from the adjacent walls of said box.

7. Apparatus as specified in claim 6 wherein:

said power means comprises a connection of said other end of said extension cable means to the opposite sides of said ejection bar, whereby the tilting of said roll-off box simultaneously exerts on said bar and on said extension cable means.

8. Apparatus for ejecting a frozen load of compacted waste from the rearward end of a roll-off container during tilting of said container on a tilt bed vehicle, said apparatus being of the type having an ejector bar pulled rearwardly along the floor of the container by the tilting of the vehicle and characterized by, a pair of extension cables each extending from an opposite side of said bar, forwardly along said floor, thence upwardly along the front wall and thence rearwardly along the roof of said container to a terminal end anchored to said roof at a spaced distance in rear of said front wall, the rearward pulling of said bar causing said extension cables to exert compressive, squeezing forces on the frozen front end of said load to free the same from adhesion to the adjacent walls of said container.

* * * * *